United States Patent [19]

Hagin et al.

[11] Patent Number: 4,959,962

[45] Date of Patent: Oct. 2, 1990

[54] STARTER SYSTEM FOR AUTOMATICALLY TURNING OFF AND RESTARTING A MOTOR VEHICLE ENGINE

[75] Inventors: Faust Hagin; Hans Drewitz, both of Munich, Fed. Rep. of Germany

[73] Assignee: MAN Nutzfahrzeuge GmbH, Munich, Fed. Rep. of Germany

[21] Appl. No.: 476,143

[22] Filed: Feb. 7, 1990

Related U.S. Application Data

[63] Continuation of Ser. No. 7/234,255, Aug. 19, 1988, abandoned.

[30] Foreign Application Priority Data

Aug. 27, 1987 [DE] Fed. Rep. of Germany ....... 3728539
Jun. 16, 1988 [DE] Fed. Rep. of Germany ....... 3820465

[51] Int. Cl.$^5$ ............................................. F02N 30/00
[52] U.S. Cl. ......................................... 60/626; 60/627
[58] Field of Search ......................... 60/625, 626, 627; 74/687

[56] References Cited

U.S. PATENT DOCUMENTS

| 3,384,027 | 5/1968 | Jennings et al. | 60/527 X |
| 4,227,587 | 10/1980 | Carman | 60/414 X |
| 4,235,216 | 11/1980 | Miles | 60/626 X |
| 4,741,410 | 5/1988 | Tunmore | 60/626 X |

Primary Examiner—Allen M. Ostrager
Attorney, Agent, or Firm—Ladas & Parry

[57] ABSTRACT

In order to avoid the necessity of a conventional electric starter motor a hydrostatic starting system for the engine of a motor vehicle is proposed for the engine whose output shaft is connected with a hydromechanical power transmission, composed of a mechanical part and at least two hydrostatic machines. The starter system comprises its own hydraulic accumulator which as regards its filling capacity and power output is designed for starting the engine at least once and a controller which responds to certain halt and operational states of the vehicle. The charging of the hydraulic accumulator takes place during braking of the vehicle via the hydrostatic machines of the power transmission or, if there is insufficient brake power, of an auxiliary device.

17 Claims, 3 Drawing Sheets

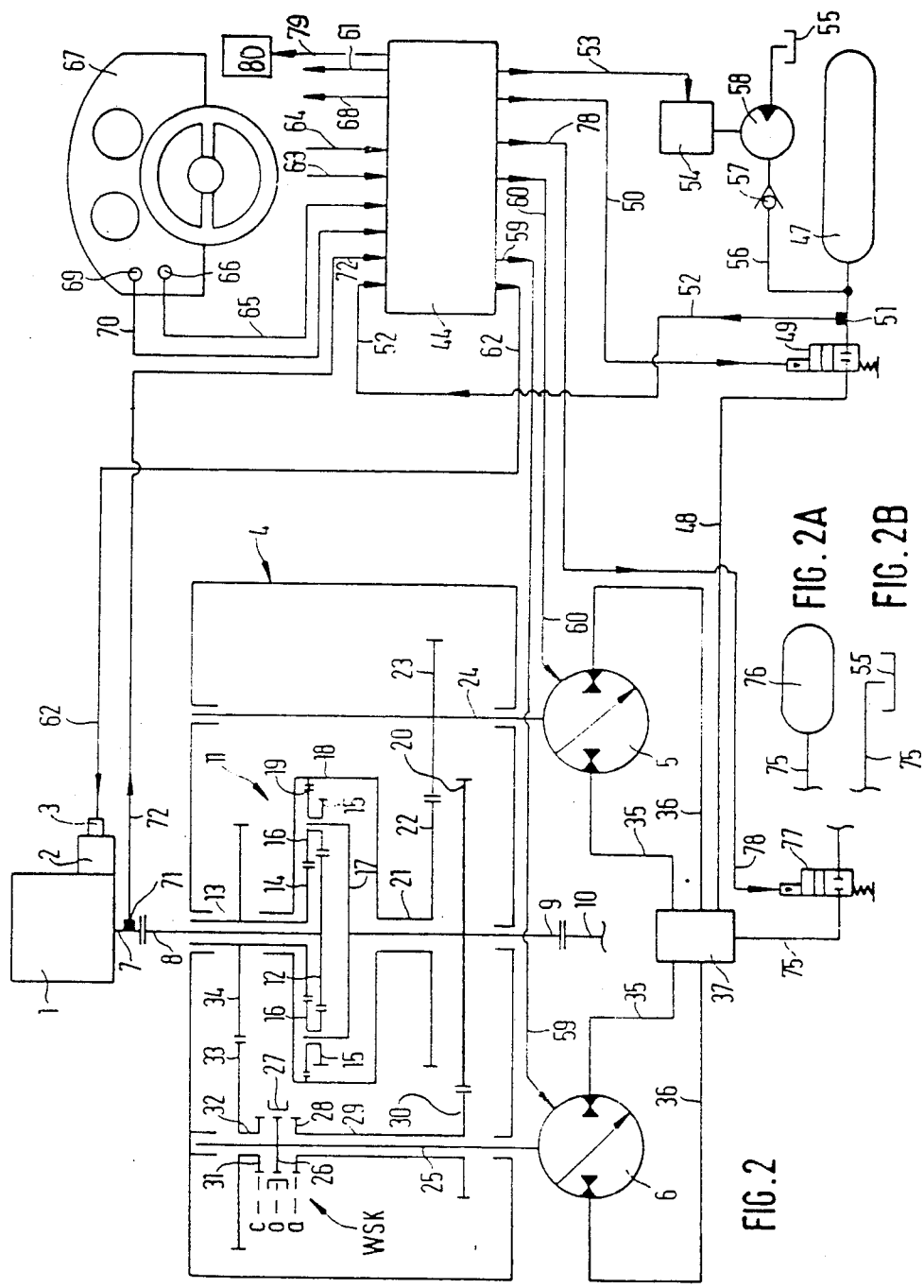

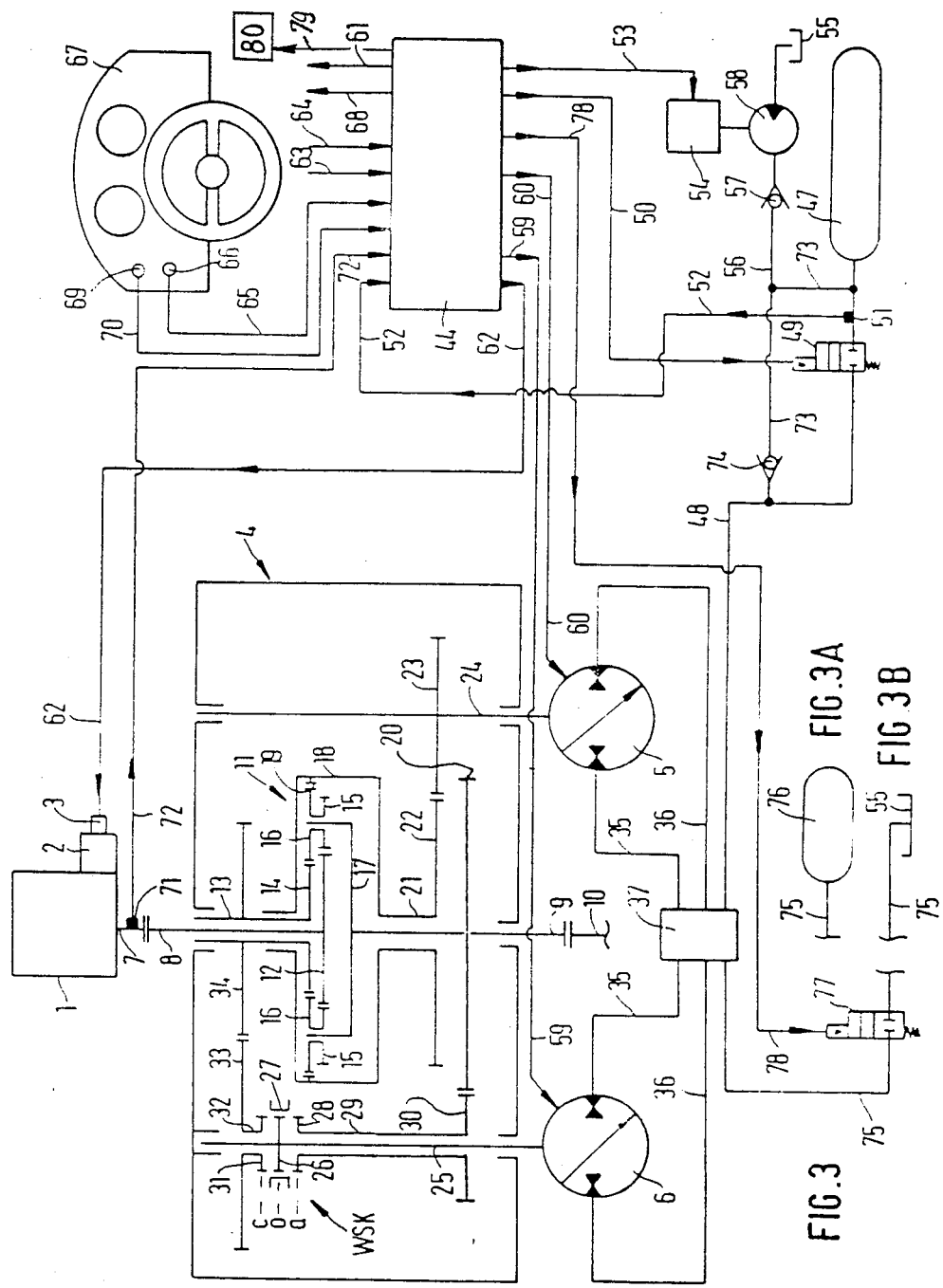

STARTER SYSTEM FOR AUTOMATICALLY TURNING OFF AND RESTARTING A MOTOR VEHICLE ENGINE

This is a continuation of copending application(s) Ser. No. 07/234,255 filed on Aug. 19, 1988 now abandoned.

FIELD OF THE INVENTION

The invention relates to a starter system for the engine of a motor vehicle in which the output shaft of the engine is connected with a hydromechanical power transmission, composed of a mechanical part and at least two hydrostatic machines, for driving the vehicle.

DESCRIPTION OF RELEVANT ART

For reducing the amount of exhaust gases and economizing in energy it is expedient, at least when a motor vehicle has halted for a while, to turn off the engine of the vehicle. This may, for instance, be the case when stopping for a relatively time at traffic lights, when waiting at a railroad crossing and, in the case of an omnibus on regular services, for example when at a bus stop. Such turning off of the engine may be performed by the driver directly, but systems have been proposed to automatically switch off and restart the engine. In such a case a flywheel, which is a part of a brake energy recovery system and which on braking accumulates energy of rotation, is utilized for starting the engine again, the flywheel then being coupled with the crankshaft of the engine. Such an additional flywheel—its size is in any case prohibitive—is however not provided on every vehicle and due to its size may not be capable of being fitted in every type of vehicle.

In another design a high pressure accumulator of a hydrostatic brake energy recovering means, which during braking of the vehicle stores the brake energy in the form of pressure energy, is used as a source of energy for restarting the engine in conjunction with a hydrostatic machine of a hydromechanical power transmission. In this system the conventional starter is still an essential part of the vehicle, since if the accumulator is not sufficiently filled or discharged, there is no other way of starting the engine. This design is thus not satisfactory either.

Furthermore frequent turning off of the engine and restarting it again using a conventional electric starter motor after a short stops leads to relatively short life of the starter, thereby offsetting the the utility of this component, more saving in fuel.

In the Swiss technical periodical "Automobilrevue" no. 29, July-16, 1987 a compressed air starter for omnibuses operating in regular city services was described, whose compressed air accumulator was of the type used for operating the brakes and other systems in the vehicle. To feed the compressed air system there is a two-cylinder compressor driven from the engine. Such compressed air starters, however, suffer from certain disadvantages. Compressors have a relatively poor efficiency, that is to say they require a relatively high drive power to produce the desired pressure. For producing the pressure the engine has to be running and this involves increased fuel consumption. For starting, a certain energy is required in the compressed air receiver in accordance with the size of the engine. However, as is known, such receivers have a low energy so that the result is a relatively high weight and a large space requirement. All in all, compressed air starting systems involve a relatively large number of components. The most telling disadvantage is however that if the compressed air supply fails for some reason or one restarting of the drive engine is impossible. The remedy is to supply compressed air from outside the vehicle. This means that an air supply is needed which is generally not to be found anywhere near where the engine has stopped. A precaution against such a mishap is not to turn off the engine if there is not sufficient compressed air for operating the starter. This as well is inexpedient, for the engine will have to be turned off sometime. If this is done where there is no air supply independent of the vehicle the latter will have to be towed away.

SUMMARY OF THE INVENTION.

One object of the present invention is to provide a starting system for the engine of a vehicle with the initially mentioned features such that it is possible to dispense with a conventional starter motor.

In order to achieve this and other objects the starter system comprises a hydraulic accumulator which has a filling capacity and power output designed for starting the engine at least once, an automatically acting braking device to prevent motion of the vehicle during starting of the engine, at least in the reverse direction of the vehicle, and controller means which, automatically acting, in accordance with certain hold and operational states of the vehicle effects the following:

(a) turning off of the engine, (b) starting the engine by discharge of the hydraulic accumulator and driving the crankshaft of the engine via the hydromechanical power transmission, (c) actuating the braking device during operation (b), and (d) recharging the hydraulic accumulator to a sufficient state of filling from the power transmission or an auxiliary unit.

Such a hydrostatic starting system makes it possible even to dispense with a conventional electric starter motor, because there is always sufficient energy stored in the associated hydraulic accumulator and the energy is sufficient for at least one engine starting operation. The charging of the hydraulic accumulator takes place mostly during braking of the vehicle, that is to say, more especially prior to storing energy in a hydraulic accumulator of any brake energy recovery system that may be present. As an aid in this respect the charging of the hydraulic accumulator may also be effected by an auxiliary device as defined below.

The invention will now be described in more detail with reference to the drawings.

BRIEF DESCRIPTION OF THE SEVERAL FIGURES OF THE DRAWING.

FIG. 1 diagrammatically shows one working embodiment of the hydrostatic starting system in a motor vehicle, which is equipped with a hydrostatic brake energy recovery device.

FIG. 2 diagrammatically shows a starting system as in FIG. 1 in a motor vehicle without a brake energy recovery system.

FIGS. 2A and 2B each show a device for receiving drained hydraulic oil after having been used in the starter system in accordance with FIG. 2.

FIG. 3 diagrammatically shows a device which may be used as an alternative to that of FIG. 2.

FIGS. 3A and 3B each show a device for receiving drained hydraulic oil after having been used in the starter system in accordance with FIG. 3.

DETAILED DESCRIPTION OF WORKING EMBODIMENTS OF THE INVENTION.

Figure 1:
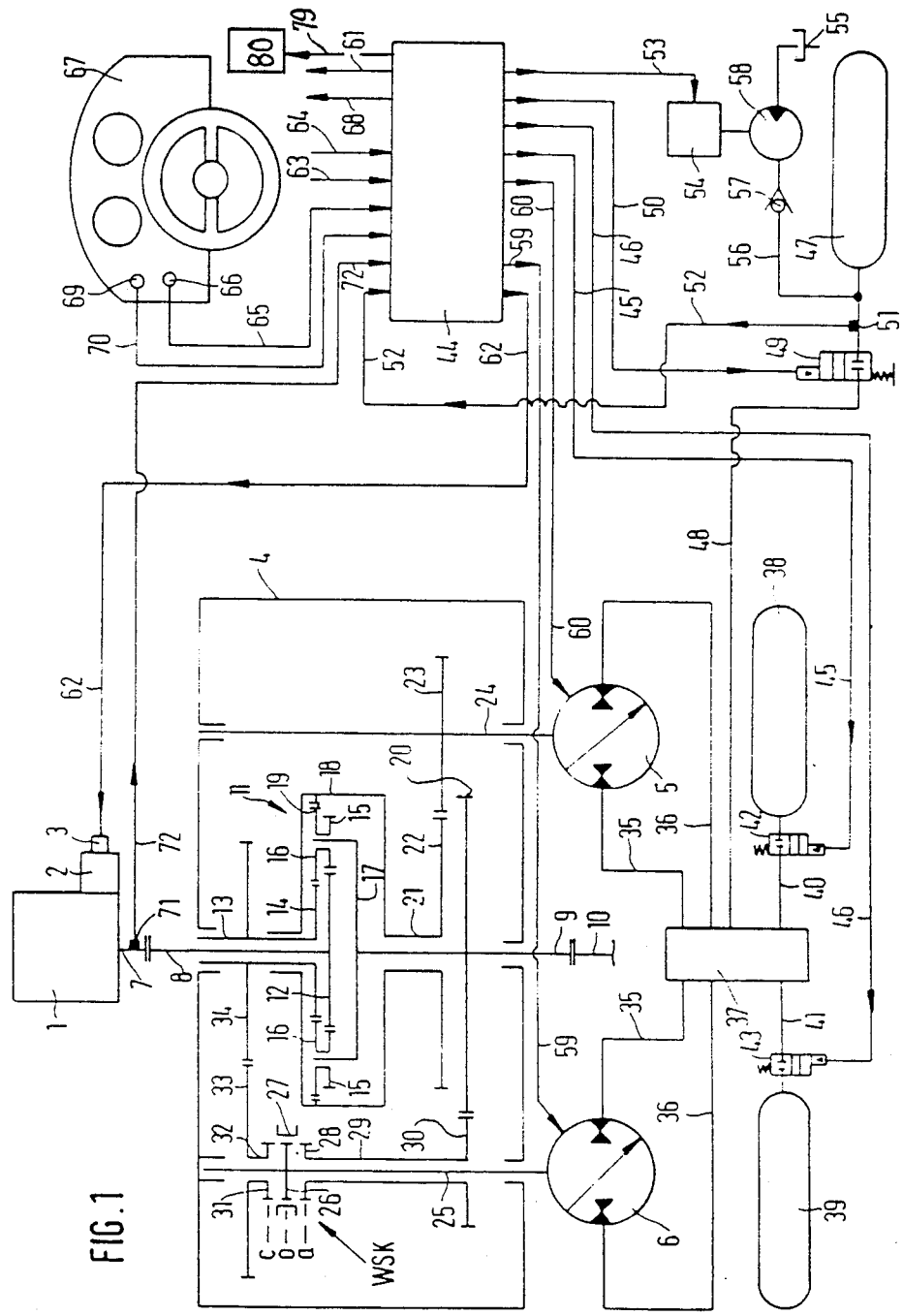

In the figures like parts are denoted by like references.

In FIG. 1 the starting device may be part of a motor vehicle, such as a city omnibus, more especially operating with frequent stops to pick up and drop off passengers or goods.

The starting device as shown in FIGS. 2 and 3 on the other hand may be part of any type of vehicle, as for example a private motor car or a commercial vehicle.

The vehicle generally has a drive means in the form of an engine 1 with an injection pump or fuel metering device 2 and means 3 for setting the rate of fuel supply or for metering such supply and a hydromechanical power transmission 4. The latter comprises a mechanical transmission and a hydrostatic part with at least two hydrostatic machines 5 and 6. The engine 1, for instance a diesel engine, is permanently connected via its crankshaft 7 with the input shaft 8 of the power transmission 4. Between the output shaft 9 with which the axle power train for a driven vehicle axle 10 is connected, and the input shaft 8 of the power transmission there is a planetary differential 11 as part of this system. The power transmission 4 shown is of a design which is only to be considered as one of a number of possible examples and the invention is not limited to this particular type. The planetary differential 11 comprises a large sun wheel 12 connected with the input shaft 8, a small sun wheel 14 connected with a hollow shaft 13, a web 17 which is connected with the output shaft 9 and rotatably bears at least one double planetary wheel 15 and 16, and a transmission housing 18, able to be rotated about the hollow shaft 13, with internal gear teeth 19. The planetary wheel 16 is in mesh both with the internal gear teeth 19 and the small sun wheel 14, whereas the planetary wheel 15 is in mesh with the large sun wheel 12. A gear wheel 22 is connected via a hub 21 with the transmission housing 18 and this wheel 22 is in mesh with a gear wheel 23 of smaller diameter, which is mounted on a shaft 24 producing a mechanical connection with the hydrostatic machine 5.

The driving connection between the hydrostatic machine 6 and the planetary differential 11 is obtained through two gearing units of different size, (and which may be selectively put into operation via a two-way clutch WSK) via a shaft 25 producing a mechanical connection with the hydrostatic machine 6. For this purpose a driving disk 26 is keyed on the shaft 25 and on the disk there is a clutch drive ring 27 which rotates and may be moved axially out of a neutral position into a clutch setting position, a or c. In the clutch setting position a the clutch produces a connection with a clutch disk 28, which via a hub 29 carries a gear wheel 30 which is in mesh with gear teeth 20, arranged with a substantially larger diameter, on the output shaft 9 of the transmission. In the clutch setting position c the clutch driving ring 27 comes into engagement with a clutch disk 31, which is connected via a hub 32 with a gear wheel 33, which is in mesh with a gear wheel 34 connected with the hollow shaft 13.

Both of the hydrostatic machines 5 and 6 may be operated in both directions as a motor or a pump and are connected via hydraulic lines 35 and 36 and a hydraulic controller 37 (not shown in detail) with each other.

In the state shown in FIG. 1 the controller hydraulically connects the hydrostatic machines 5 and 6 with a high pressure hydraulic accumulator 38 and a low pressure hydraulic accumulator 39 of a hydrostatic brake energy recovery system. In this connection supply lines 40 and 41, respectively have, shut off valves 42 and 43, which are electromagnetically operated and can assume open or shut conditions. These shut off valves 42 and 43 are controlled by an electric controller 44 via electrical operating wires 45 and 46, respectively. The controller 44 furthermore serves to cause the starting and turning off of the engine 1 and as a part of the starting system is described in more detail below.

The speed of rotation of the drive output shaft 9 is a result of the speeds of the large sun wheel 12 and of the transmission housing 18, on which the speeds of the planetary wheels 15 and 19 and of the web 17 are dependent. Owing to the gear wheels 23 and 22 the speed and direction of the transmission housing 18 with its gear teeth 19 area function of the speed and direction of the hydrostatic machine 5.

If the transmission output shaft 9 and thus the axle power train 10 of the vehicle are to be accelerated in a first operational range $n_{output}$ to $n_{input}$ < approximately 50%, wherein n denotes speed of rotation from the stationary state of the vehicle, when the direction of rotation of the transmission housing is opposite to the direction of the sun wheel 12 the hydrostatic machine 5 is operated as a pump and supplies this converted power to the hydrostatic machine 6. The latter is drivingly connected via the clutch 27 in the setting position a and the gearing in the form of the gear teeth 20 and the gear wheel 30 with the output shaft 9 and then operates as a motor via the shaft 25. At the end of this first operational range the hydrostatic machine 5 will be at least substantially stationary. The entire supplied power is practically transmitted by the mechanical part of the power transmission 4. If the vehicle is to be further accelerated or operated at a higher speed, the two-way clutch WSK is switched over from the clutch setting position a to the setting position c with an increase in the speed of the transmission output shaft 9 so that then the small sun wheel 14 will be drivingly connected with the hydrostatic machine 6 via the hollow shaft, the gear wheels 34 and 35 and the shaft 25. In this second operational range ($n_{output}$ to $n_{input}$ > approximately 50%) with the same direction of rotation of the transmission housing 18 and of the large sun wheel 12 the hydrostatic machine 5 then operates as previously as a motor, which receives its power via the lines 35 and 36 from the hydrostatic machine 6, which now operates as a pump. The driving power for the hydrostatic machine 6 is in this operational range thus transmitted from the hollow shaft 13.

If the vehicle is braked, then in the state illustrated in FIG. 1 due to the cooperation of the hydrostatic machines 5 and 6 and of the controller 37 and, if there is a respective command signal sent out by the controller 44 via the control lines 45 and 46 to the shut off valves 42 and 43 to open them, i.e. a "valve open" command, brake energy may be stored by the build up of hydraulic pressure in the high pressure hydraulic accumulator 38.

In accordance with the invention a hydrostatic starter device is provided whose main parts are the controller 44 and an independent hydraulic accumulator 47. The capacity of the hydraulic accumulator 47 and its maximum charge pressure are designed to provide for at least one and preferably more engine starting operations.

Normally the hydraulic accumulator 47 is charged during braking of the motor vehicle by the energy released and transmitted by the hydrostatic power transmission 4, including hydrostatics machines 5 and 6 and in the case of FIG. 1 predominantly upstream from the high pressure hydraulic accumulator 38 of the brake energy recovery device.

In order to make possible this charging and discharging of the hydraulic accumulator 47 the latter is connected via a hydraulic line 48 with the hydraulic controller 37, which internally is able to be switched to provide a connection with the line 48 so that then due to the cooperation of the hydrostatic machines 5 and 6 and of the power transmission 4, braking power may be used for charging the hydraulic accumulator 47. In the line 48 there is a solenoid shut off valve 49, which may be moved between a shut off and an open position by the controller 44 connected with it via an electric control line 50. The controller 44 causes the shut off valve 49 to be switched over from the shut off position into the open position as is needed for filling the hydraulic accumulator 47, if the controller gets a signal from a pressure sensor 51 via a signal line 52 that the hydraulic accumulator 47 is not filled to a high enough level or is not sufficiently filled. In FIGS. 1 and 2 the switching of the shut off valve 49 to the open position furthermore takes place if upstream and downstream therefrom there are approximately equal pressures in the line 48. On the other hand in FIG. 3, unlike FIG. 2 (conditions being the same in other respects) the shut off valve 49 is moved in the opposite direction and the hydraulic accumulator 47 is able to be charged directly via a bypass 73 (with a check valve 74 opening in the charging direction) shunting the shut off valve 49 and connected with the line 48 upstream and downstream from the valve 49. That is to say, in this case for charging the hydraulic accumulator 47 the shut off valve 49 does not have to be operated and may remain in the shut position.

In the case in which on braking the vehicle, the braking energy made available is insufficient for effective charging of the hydraulic accumulator 47 and furthermore the degree of charge of the latter is not sufficient for a starting operation, this is detected by the pressure sensor 51 and a signal is sent to the controller 44 which sends a signal via a control line 53 to an electric motor 54 to start the motor which, as part of an auxiliary system drives an auxiliary pump 58, which draws oil from a tank 55 and supplies it to the hydraulic accumulator 47 via a line 56 with a check valve 57 only open in the forward direction, until the degree of filling of the hydraulic accumulator 47 is sufficient. When this is the case, the electric motor 54 will be stopped.

The controller 44 also sends commands via the control lines 59 and 60 to set the swash plate angles of the hydrostatic machines 5 and 6.

Furthermore the starting device also comprises means by which turning off and restarting of the engine 1 may be initiated.

The turning off of the engine 1 is automatically effected by the controller 44, if the engine is a carburetor engine, by turning off or interrupting the ignition power supply via the control line 61, or if the engine is a diesel engine, by turning off the supply of fuel, this being effected via the control line 62 by resetting the injection pump 2 to the zero feed position using the fuel rate setting member 3. This automatic switching off of the engine 1 is also effected if one or more signals are supplied via the lines 63, 64 and 65. A signal on the line 63 for instance indicates that the vehicle is stationary, a condition detected for instance by suitable sensors which are arranged on the drive wheels. The line 64 is for a signal indicating that the parking brake of the vehicle has been applied. The line 65 is for a signal indicating that the doors (for example in the case of an omnibus stopping at a stop) are being opened. Such a control signal for the opening of the door is provided by the driver using a control 66 arranged on the dashboard 67 of the vehicle. The automatic stopping of the engine 1 may also be caused by further operation of the brake after the wheels have come to a halt. Automatic switching off of the engine 1 may furthermore be caused when one or more of these signals is present immediately or, if there is a timer, with a time delay after the operational or halt condition has started.

The switching off of the engine 1 is, however, only brought about by the controller 44 if it is receiving a signal that there is sufficient pressure in the hydraulic accumulator 47 for restarting the engine.

The starting or restarting of the engine 1 (by completing the ignition current circuit via the control line 68 and by suitably setting the injection pump 2 in the case of a carburetor engine or only by setting the injection pump 2 in the case of a diesel engine) is also automatically initiated by the controller 44, if for instance there are no longer any "parking brake applied" and "door open" control signals at the controller, that is to say after the driver has released the parking brake and has operated a control 69 to close the doors so that a signal that closing has taken place is conducted by the line 70, or if the accelerator pedal is depressed.

The power for starting the engine 1 is then supplied by the suitably charged hydraulic accumulator 47. In this case the control signal line 44 passes a signal to the shut off valve 49 so that the latter is opened and via the line 62 a control signal is passed to the fuel metering or fuel rate setting means 3 of the injection pump or the fuel metering device 2 for suitably setting the latter. As soon as the shut off valve 49 has been put in the open position the contents of the hydraulic accumulator 47 expands and drives the hydrostatic machine 5. The hydrostatic machine 6 remains stationary, the two-way clutch WSK being in the position a. Thus the power from the hydrostatic machine 5 is transmitted via the gear wheels 23 and 22 to the transmission housing 18 and from the inner gear teeth 19 of the latter, the web 17 remaining stationary, via the double planetary wheels 16 and 15 to the large sun wheel 12 and from the latter via the input shaft 8 to the crankshaft 7 of the engine 1 so that the latter is turned over. The hydraulic oil flowing out of the hydraulic accumulator 47 during the starting procedure is, insofar as it is in excess of requirements, returned via a drain line 75 branching off the hydraulic controller 37 either into a low pressure hydraulic accumulator 76 (FIGS. 2A and 3A) or to the hydraulic oil tank 55 (FIGS. 2B and 3B). The opening of this oil drain facility is ensured by a shut off valve 77 placed in the drain line 75 and which is also operated via an electrical control line 78 from the controller 44, by which it is turned on for the draining of oil. During the starting phase of the engine 1 the back torque of the engine 1 and the motor torque of the hydrostatic machine 5 exert, via the web 17, a torque in the reverse direction on the output shaft 9.

A braking device, in the example consisting of a brake 79, as for instance the parking brake, activated by the controller 44 via an electrical line 80 during the starting of the engine or, not shown, a one way clutch between the output shaft 9 and the housing of the power transmission 4, prevents the torque from causing uncontrolled reverse motion of the vehicle. As soon as the controller 44 receives a signal from a tacho generator 71 via a line 72 indicating that the engine 1 has reached a minimum speed consonant with successful ignition and which does not decrease when the swash plate angle of the driven hydrostatic machine 5 is decreased from 5° to 0°, the controller 44 sends a control signal for closing the shut off valve 49. After this has been done the engine starting procedure is completed.

What is claimed is:

1. The combination comprising a hydromechanical power transmission connected to the output shaft of an engine of a motor vehicle for delivering power from the engine to drive the vehicle, and a starter system connected to said transmission to start the engine, said transmission including a mechanical drive part connected to the output shaft of the engine and a hydraulic part including two hydrostatic machines drivingly connected to one another and to said mechanical drive part, said starter system comprising a hydraulic starter accumulator connected to said two hydrostatic machines for being supplied with pressure fluid from said hydrostatic machines during drive of the engine, and for delivering the pressure fluid back to said hydraulic part of the transmission when the engine is halted to start the engine, said hydraulic starter accumulator having a filling capacity to provide a power output to start the engine at least once, means for preventing motion of the vehicle at least in the reverse direction during starting of the engine, controller means connected to said hydraulic starter accumulator, said engine and said hydromechanical power transmission for acting during halted and operational states of the vehicle for
(a) turning off the engine,
(b) starting the engine by supplying the pressure fluid in the hydraulic starter accumulator to said hydraulic part to drive the output shaft via said transmission, and
(c) supplying the starter accumulator with pressure fluid from the transmission during braking of the vehicle, and
auxiliary means connected to said starter accumulator for pressurizing the starter accumulator to enable starting the engine in the event that the accumulator is insufficiently pressurized by the transmission during braking of the vehicle.

2. The combination as claimed in claim 1 wherein said controller means is connected to said means which prevents motion of the vehicle at least in the reverse direction for operating said means during operation (b).

3. The combination as claimed in claim 1 wherein said vehicle further comprises a brake energy recovery means including a high pressure accumulator, a low pressure accumulator, a hydraulic control device, shut off valves for said high and low pressure accumulators and connecting lines connecting said high and low pressure accumulators to the hydrostatic machines via said hydraulic control device, said hydraulic control device and shut-off valves effecting charging and discharging of the hydraulic accumulators through the power transmission, said starter accumulator being charged under the control of the controller means during braking of the vehicle via the power transmission in preference to the charging of the high pressure accumulator of the brake energy recovery means.

4. The combination as claimed in claim 3 wherein the starter accumulator is connected via a first hydraulic line with the hydraulic control device and a solenoid valve is provided in said first hydraulic 1 line for being operated by the controller means for controlling connection of the starter accumulator with said hydraulic control device.

5. The starter system as claimed in claim 4 comprising a bypass line including a check valve therein bypassing said shut off valve, said check valve being opened only in the charging direction of flow.

6. The starter system as claimed in claim 3 comprising means for returning excess oil flowing from the first accumulator during starting including a drain line connected to the hydraulic control device and to the tank and a shut off valve in said drain line operated by said controlling means.

7. The combination as claimed in claim 3 comprising a pressure sensor responsive to the pressure in the starter accumulator for sending a signal via a signal line to the controller means, said controller means being constructed only to produce a signal causing charging of the starter accumulator when said pressure sensor indicates that the degree of charging of said starter accumulator is below a minimum value, said auxillary means comprising an electric motor, and an auxiliary pump connected to said motor for being driven thereby, said controller means being connected to said motor to drive the same when the brake energy produced during braking of the vehicle is not sufficient for charging the starter accumulator and the degree of charge in said starter accumulator is not sufficient for starting the engine.

8. The combination as claimed in claim 7 comprising an oil tank connected to said auxiliary pump, a connecting line connecting the auxiliary pump to said starter accumulator and a check valve in said connecting line which opens only in the direction of flow from the auxiliary pump to the starter accumulator.

9. The starter system as claimed in claim 1 wherein said controlling means only turns off the engine when it receives a signal indicating that there is sufficient pressure in the first accumulator for starting the engine at least once.

10. The starter system as claimed in claim 1 comprising means for returning any excess hydraulic oil during starting of the engine from the first accumulator to drive the first hydrostatic machine including a drain line connected to the hydraulic control device, a hydraulic oil tank connected to the hydraulic control device and a shut off valve in said drain line operated by said controller means.

11. The combination as claimed in claim 1 wherein said controller means automatically turns the engine off in response to at least one signal indicating that the vehicle is in a halted condition indicated by at least one of the following:
application of a parking brake;
a stationary state of driving wheels of the vehicle;
an open state of at least one door of the vehicle; and
operation of the brakes after the wheels have ceased moving.

12. The combination as claimed in claim 11 wherein said controlling means includes means for restarting the engine after a previous halting thereof automatically when at least one of the signals for turning off the engine is discontinued.

13. The combination as claimed in claim 11 wherein said controlling means includes means for starting and restarting the engine automatically when a signal indicating actuation of an accelerator pedal of the vehicle is produced.

14. The combination as claimed in claim 12 wherein said controller means includes means for starting and restarting the engine automatically when a signal indicating actuation of an accelerator pedal of the vehicle is produced and a shut off valve is opened, under the power supplied by expansion of the fluid in the starter accumulator which drives one of the hydrostatic machines through the mechanical part of the power transmission while the other hydrostatic machine is stationary.

15. The starter system as claime din claim 14 wherein the starter of the engine is only operated by the controller means when the shut off valve is open and the controller means receives a signal indicating that the engine speed corresponds to a successful ignition, even if a swash plate angle of the hydrostatic machine is decreased to zero, said shut off valve then being closed when said speed is reached.

16. The combination as claimed in claim 1 comprising a pressure sensor responsive to the pressure in the starter accumulator for sending a signal via a signal line to the controller means.

17. The combination as claimed in claim 16 wherein said controller means is constructed only to produce a signal causing charging of said starter accumulator when said pressure sensor indicates that the degree of charging of said starter accumulator is below a minimum value.

* * * * *